United States Patent [19]

Irwin

[11] 4,000,779
[45] Jan. 4, 1977

[54] BLOWOFF BAFFLE

[75] Inventor: John W. Irwin, Trenton, N.J.
[73] Assignee: General Electric Company, Louisville, Ky.
[22] Filed: Nov. 28, 1975
[21] Appl. No.: 635,859
[52] U.S. Cl. .............................. 165/111; 62/285; 62/288
[51] Int. Cl.² .................................. F25D 21/14
[58] Field of Search ............ 165/111, 124; 62/272, 62/288–291, 285

[56] References Cited
UNITED STATES PATENTS

| | | | |
|---|---|---|---|
| 3,000,193 | 9/1961 | Crider | 62/285 |
| 3,628,590 | 12/1971 | Knebusch | 62/288 X |
| 3,831,670 | 8/1974 | Mullings | 165/124 |
| 3,923,098 | 12/1975 | Ares | 62/288 X |

Primary Examiner—Albert W. Davis, Jr.
Attorney, Agent, or Firm—Frank P. Giacalone; Francis H. Boos

[57] ABSTRACT

The present invention provides a condensate guide arranged in the path of a flow of air through an A-coil heat exchanger including slabs oriented generally horizontally relative to the air flow. The condensate guide is positioned downstream of the heat exchanger so that condensate when blown from the surface of the heat exchanger by the air flow therethrough impinges on the guide thereby removing it from the path of air and directing it to an appropriate drain.

7 Claims, 4 Drawing Figures

BLOWOFF BAFFLE

BACKGROUND OF THE INVENTION

The present invention relates generally to an air handling structure and in particular to a horizontally oriented A-coil heat exchanger arranged in a housing forming a part of a central air conditioning system, with the coil being in series with the system blower. The A-coil heat exchanger or evaporator which in common practice is two evaporator slabs or plates, is connected at its apex by an air deflector or guide member as shown and described in U.S. Pat. No. 3,831,670—Mullings, assigned to the General Electric Company, assignee of the present invention. The air deflector member allows a smooth unrestricted flow of air to travel through the coils by allowing the air to remain closer to the center of the coil by pulling the air streams toward a parallel flow, thereby preventing the displacement of the air stream.

In the present invention, the A-coil heat exchanger is arranged so that the slabs are oriented generally horizontal relative to the flow of air. In operation of the air conditioning apparatus, all of the relatively warm air moves through the cooler heat exchanger, water vapor condenses out of the air and collects on the surfaces of the slab members.

When such condensation takes place, it generally collects on the surfaces of the coil, first as a light mist, and eventually attaining droplet size. These droplets generally collect on the lower portion of the heat exchanger and may present serious problems in the operations of the unit, and accordingly provision must normally be made for the collection and removal of the condensate from the system.

It has been discovered that condensate forming on a slab coil would tend to run downwardly along a seam of the slab structure and finally drop at its lowermost edge. Frequently therefore, a drain pan is provided at the lower level end of the heat exchanger to collect the condensate so that it may be evaporated off, or otherwise removed from the system. To be effective, the pan is generally positioned so that condensate may drip or run into it by the action of gravity.

In orienting an A-coil so that the slabs are generally horizontal with one coil arranged above the other as in the case of the present invention, the drip pan arranged on the lower edge of the heat exchanger while effectively collecting condensate from the lower portion of the lower coil, does not generally receive condensate from the upper coil during operation of the system blower. Since the condensate collected on the lower end of the upper coil is in droplet form or size, and with the air flow being generally at the rate of between 350 and 550 cubic feet per minute per ton of cooling capacity, the droplets would not fall down into the pan, but in effect would pick a course anywhere between horizontal and vertical and accordingly be blown out of the housing or atomized. It should be understood that condensate entrapped in the airstream may cause corrosive damage to the housing and may in some instances be carried out of the housing area to the electrical components of the system thereby causing a potential hazardous condition.

It is therefore an object of the present invention to provide an effective condensate collecting system for a horizontally oriented A-coil heat exchanger.

A further object is to provide an evaporator A-coil wherein substantially all of the condensate dripping from the upper slide is caught in a drip pan arranged below the lower slab.

SUMMARY OF THE INVENTION

By this invention there is provided an air handling structure including a housing having an A-coil heat exchanger located in a path of a flow of air and includes a pair of generally horizontally extending slabs arranged one above the other. The downstream axial ends are substantially parallel and spaced from each other to define an opening and converge toward the upstream end so that substantially all of the air moving through the opening contacts the heat exchanger.

An air deflector is arranged at the apex of the plates and extends laterally relative to the air flow path substantially the full width of the heat exchangers.

A condensate guide member extending substantially the full width of the air deflector is arranged so that a collecting portion extends into the path of air passing through the lower portion of the upper slab, so that when condensate in the lower edge of said upper slab is sufficient to be carried off by the air flow, it impinges on the guide member and is directed into the drip pan.

DESCRIPTION OF THE PREFERRED EMBODIMENT

Figure 1:
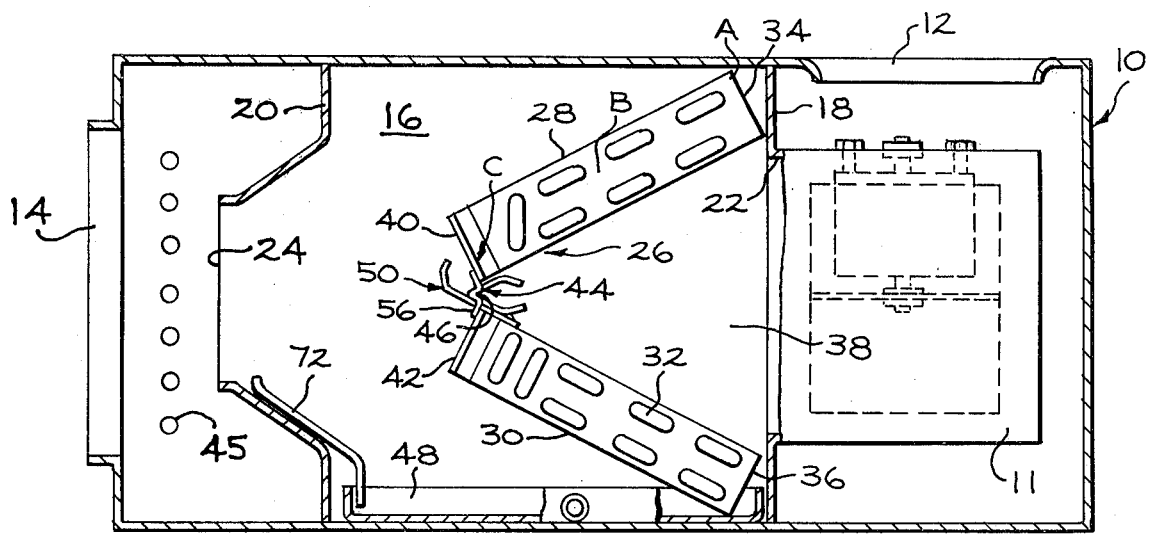
FIG. 1 is an elevational view in section of an air handling structure including a heat exchanger embodying the condensate guide of the present invention.

Referring to FIG. 1, there is shown a hot air furnace 10, which includes a blower or air handling means 11 for moving air from an air inlet 12 through the furnace 10 and for delivering air to an outlet 14 and into a distribution (not shown). The furnace 10 includes a housing area 16 formed between an inlet barrier 18 and an outlet barrier 20. The inlet barrier includes an opening 22 for receiving air flow from the blower 11, while the barrier 20 includes an air outlet opening 24 for discharging the air from the housing area 16. Located in the housing 16 and positioned adjacent the inlet 22 is an A-coil heat exchanger or evaporator assembly indicated generally at 26.

The evaporator assembly 26 comprises a pair of conventional air conditioning coil heat exchanger assembly or slabs 28 and 30. The plates or slabs are conventional in design and are fabricated from a series of flat, thin, substantially rectangular plates or fins, and have the usual refrigerant tubing 32 passing therethrough as part of the refrigerant system.

As applied in conjunction with the present invention the slabs 28, 30 as shown in FIG. 1 are arranged generally horizontally with slab 28 being located above slab 30. The downstream end portions 34, 36 respectively of slabs 28, 30 adjacent the barrier 18 are substantially parallel and are spaced from each other to define an opening 38 which is in alignment with inlet 22. The slabs 28, 30 converge axially from the spaced apart ends 34, 36 toward the downstream ends 40, 42 respectively of the slabs 28, 30 so that substantially all of the air moving through inlet 22 and opening 34 contacts all of the heat exchanger surface area. An air deflector member 44 of the diamond shaped type shown and described in the above referred to U.S. Pat. No. 3,831,670—Mullings is arranged to connect the end portions 40, 42 of the heat exchanger 26 at its converged or apex end as described in the Mullings patent to allow a smooth unrestricted flow of air to travel through the coils by allowing the air to remain closer to the center of the coil by pulling the air stream toward a parallel flow, thereby preventing the displacement of the air stream. The deflector 44 as employed in the present embodiment of the invention is fabricated from a single piece of sheet material which is bent upon itself centrally to provide a ridge 46 (FIG. 2) which forms the downstream acute angle of the diamond shaped deflector 44. The deflector 44 extends laterally relative to the path of air substantially the full width of the heat exchanger. Completing the deflector 44 from ridge 46 are walls 47 which extend outwardly at an angle approximating the angle of the converging slabs 28 and 30 to ridges 49 forming the side angle or ridges of the diamond and then converge inwardly to complete the substantially diamond configuration.

It should be understood that an evaporator coil in an air conditioner collects water on its cool surfaces as the moist relatively warm air passes over them. Means are provided in the present embodiment to collect any condensate that may be formed on the heat exchanger 26, accordingly, a drip pan 48 is generally located below the heat exchanger 26 so that condensate dropping from the heat exchanger by gravity will collect in the pan 48 where it is drained off and disposed of. However, with the high velocity air passing through a horizontal oriented coil generally at the rate of 350 to 550 cubic feet per minute per ton of cooling capacity, the water does not drain down vertically, it in fact under the influence of the air stream, may take a course anywhere between horizontal and vertical and as a result does not drop into the pan 48 positioned below the evaporator.

In following the path of condensate on the upper slab 28, it would generally or initially collect at point A (FIG. 1) in a small amount as a wet surface and is then pushed by the air flow into another small amount of accumulation. When this ever increasing accumulation of small amounts reaches generally the area designated at C, the water particles have joined or lumped together to form droplets. These droplets are then blown off by the air as they are formed, or, run down the incline of slab 28 and blow off at its lowermost end 40 and more specifically area C in FIGS. 1 and 2. Water, when blown off of the slab at this elevation relative to the drain pan 48 as mentioned hereinbefore, is carried in the air flow and ends up at a point outside of the drain pan. The water carried off the slab 28 by the air stream may in fact atomize in the air path and be carried out of the housing area 16 causing flooding, corrosion and possible hazardous electrical problems in the event water accumulates on electrical components that are located outside of housing 16 such as resistance heater 45.

In accordance with the embodiment of the present invention a condensate guide means or member 50 is provided so that water collected on the bottom portion of slab 28 and blown off into the path of air by blower 11 from the slab 28 is directed into drain pan 48.

Figure 2:
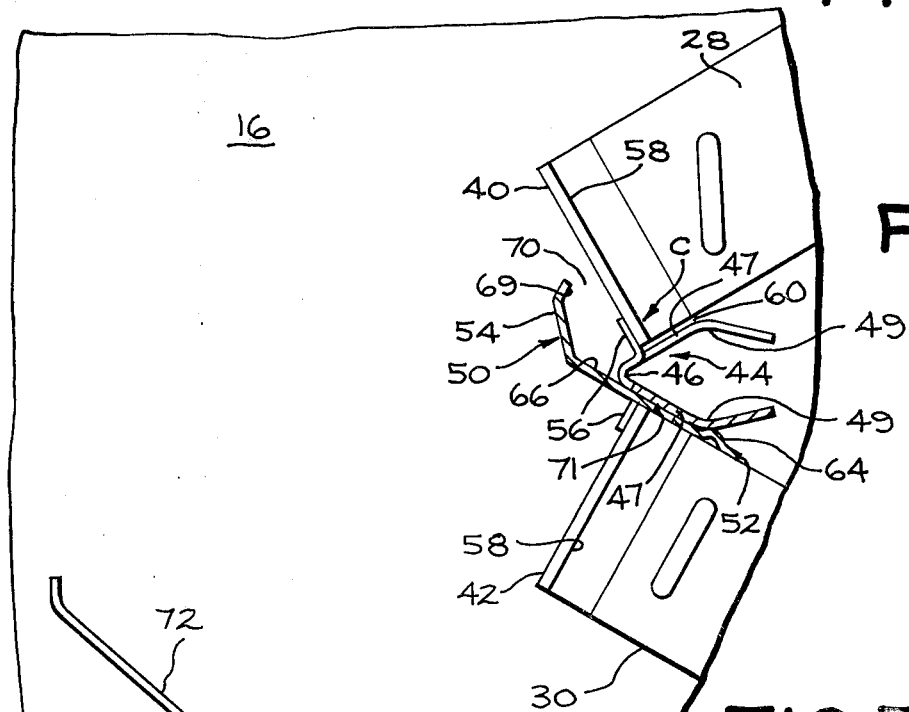
FIG. 2 is a view showing an enlarged portion of FIG. 1 showing details of the present invention.
Figure 3:
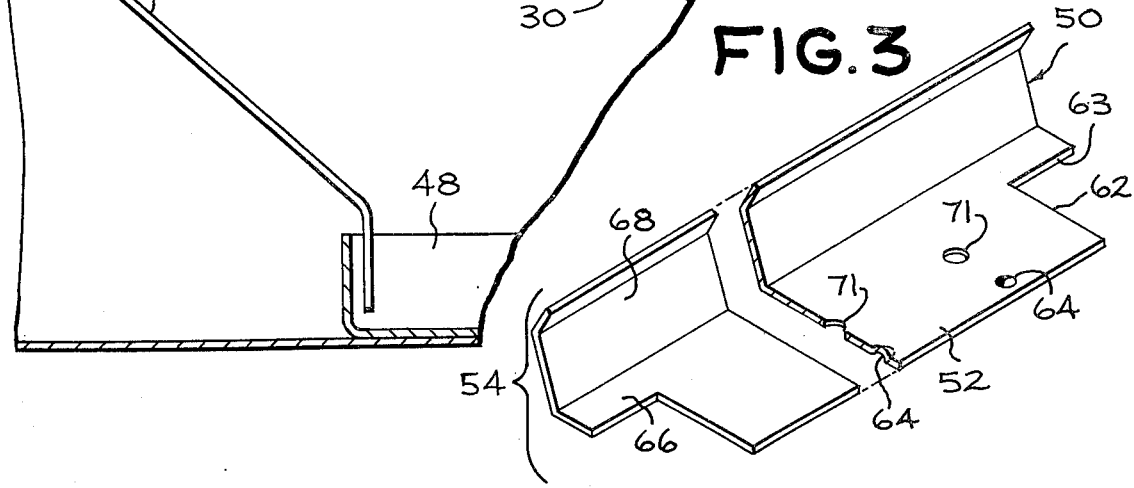
FIG. 3 is a perspective of the condensate guide member.

Referring to FIGS. 2 and 3, the guide means 50 includes generally a tab or holding portion 52 that, as will hereinafter be described, is utilized to secure the guide member 50 to the heat exchanger 26 and, a condensate collecting portion 54 which is dimensioned and positioned relative to the slab 28 so as to effectively collect condensate when blown off the end portion 40 of slab 28. As best seen in FIGS. 1 and 2, air deflector 44 is provided with ears 56 that are secured to the slabs 28 and 30 respectively. The ears 56 are located at the lateral end portions of deflector 44 so that they align with, and are secured to flange members 58 formed on the ends or outer fins of each slab 28, 30. The ears 56 are positioned on the flanges 58 to provide a space or passageway 60 between the air deflector walls 47 and the corresponding downstream or inside surfaces of the "A" coil assembly slabs 28 and 30.

Figure 4:
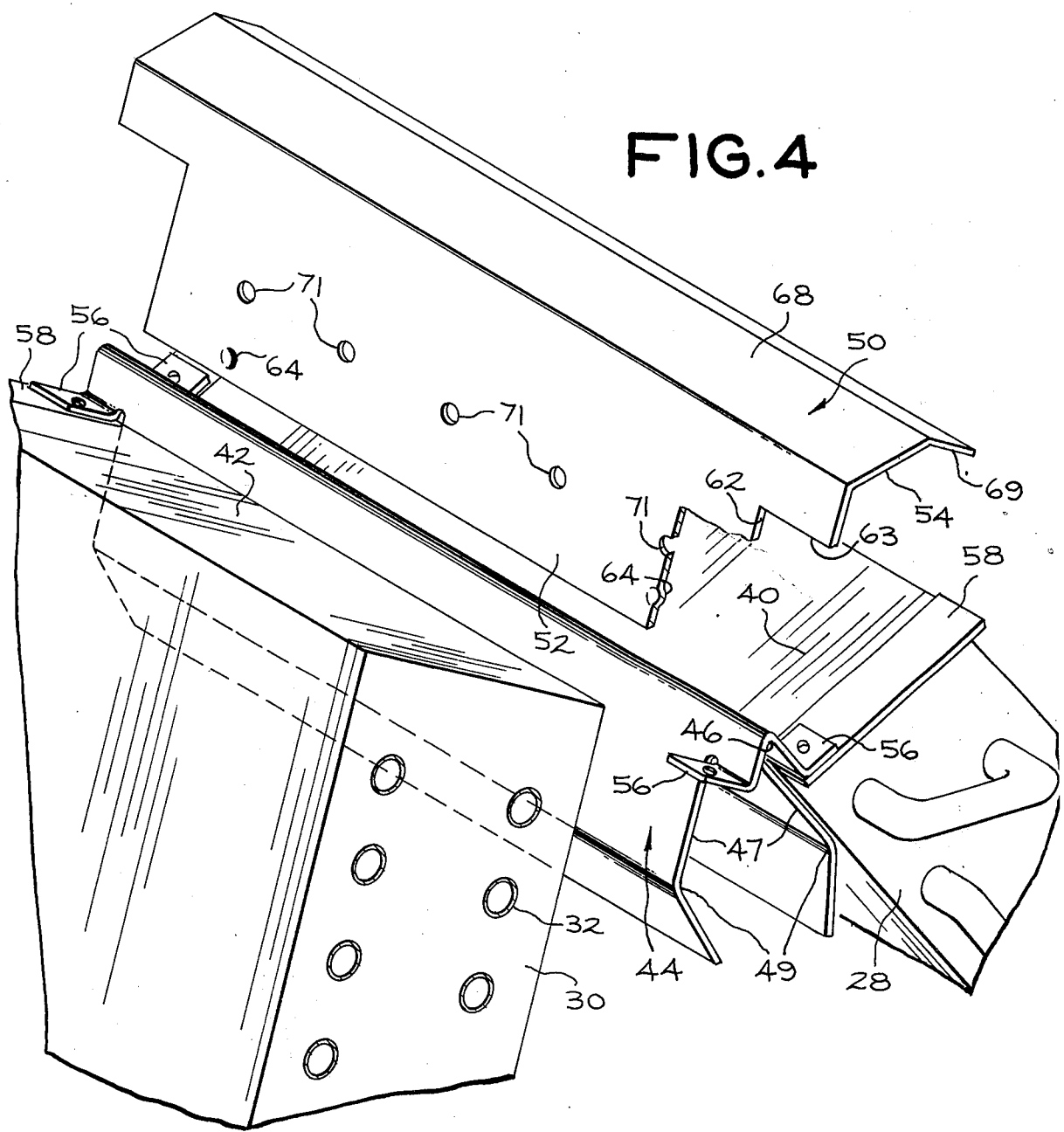
FIG. 4 is a perspective view showing the condensate guide member and the cooperating portions of the heat exchanger.

The collecting portion 54 is dimensioned to extend laterally substantially the full width of the heat exchanger assembly 26 while the member 50 in the tab portion area 52 is provided with a cutout or notch 62 at its laterally disposed ends. Accordingly, the tab portion 52 is dimensioned to fit within the ears 56 as shown in FIG. 4. In operation when an "A" coil assembly is to be used in the horizontal modes in accordance with the present embodiment of the invention as illustrated in the drawings, the member 50 and more specifically the tab portion 52 thereof is inserted in the space 60 between the lower slab 30 and the deflector wall 47 as shown in FIG. 2.

To locate the condensate guide 50 as shown in FIG. 2 so that the condensate collecting portion 54 is positioned properly relative to the path of air moving through the lower portion of slab 28, the end of portion 54 that extends past the notch 62 provides a shoulder or stop 63 portion which as shown in FIG. 4, is adapted to engage the ears 56 when member 50 is positioned correctly relative to the heat exchanger.

Means are also provided by the present invention to removably hold the guide member 50 securely in place relative to the heat exchanger. To this end there is provided a plurality of nodes or projecting holding means 64 spaced laterally along the free end of tab portion 52. The projections are positioned axially on the tab 52 relative to the stop 63, and are dimensioned so that they snap past the wall portion 47 at the ridge 49 as the stop 63 engages the ears 56. In effect the combination of stop 63 and nodes 64 acting on ears 56 and ridge 49 respectively are effective in removably holding guide 50 in its proper position relative to the heat exchanger.

The collecting portion 54 includes an extension 66 of portion 50 that continues downstream and upwardly at substantially the converging angle of slab 30 to a point beyond and above the ridge 46 of member 44. Extending further downstream from portion 66 is a bent up baffle portion 68 that extends generally upwardly therefrom to a position above the lower end of slab 28. The baffle portion 68 in effect provides a laterally extending surface that is in the path of air passing through slab 28 generally at area C. The portion 68 is further bent along its free end to provide a laterally extending lip 69 projecting toward the end 58 of slab 28.

As installed the member 50 provides an opening 70 arranged between the lower edge 58 of slab 28 and lip 69 of the collecting portion 54. This gap or opening 70 between lip 69 and end 58 is critical in carrying out the present invention and must be carefully calibrated. Too large an opening or gap will not effectively trap condensate when blown off and on the other hand a gap that is too small will cause an increase in air velocity moving through the gap which would push water up the wall of portions 66, 68 and past lip 69 and into the path of air. In the present instance with the velocity of air passing through the coils at the rate of between 350 and 550 cubic feet per minute per ton of cooling capacity, a space or gap of .38 inches between the end 58 of slab 28 and the lip 69 of the collecting portion 54 has been found to work effectively in capturing condensate when it collects on the lower end of slab 28 and is blown through into the air path.

Condensate collecting generally in area C (FIG. 1 and FIG. 2) does not see much of the air flow since it is shielded by the collecting portion 54 of the air guide member 50, and the condensate water is thereby free to run downhill on portion 66 and out of the holes 71 located in the tab portion 52. Water running through the holes 71 mix with the condensate formed on the lower slab 30 where it either runs along the lowest edges and drops or is blown off into the drain pan 48.

Provision is also made to direct condensate into the drain pan 48 when it is blown off the lower slab 30 or at a point below the apex of the A coil heat exchanger. Accordingly a shield 72 is provided that has its lower end positioned in the pan 48. The shield 72 extends upwardly into the path of air and toward the opening 24 at a distance sufficient to cause condensate when blown off the "A" coil to impinge on its surface and drain into the pan 48.

The foregoing is a description of the preferred embodiment of the invention and variations may be made thereto without departing from the true spirit of the invention, as defined in the appended claims.

What is claimed is:

1. An air handling structure including a housing having a heat exchanger arranged in the path of a flow of air, a drip pan means in said housing arranged below said heat exchanger for receiving condensate from said heat exchanger, comprising:
    said heat exchanger including a pair of generally horizontally extending slab heat exchangers arranged one above the other, each having a first upstream and a second downstream axial ends;
    said first ends being substantially parallel and spaced from each other to define an opening therebetween to allow movement of air therethrough, and converging axially toward said second ends so that substantially all of the air moving through the opening contacts the heat exchangers;
    air deflector means of substantially diamond shape connecting said second ends of said heat exchanger and extending laterally relative to the air flow path substantially the full width of said heat exchangers;
    a condensate guide means extending substantially the full width of said air deflector means including a condensate collecting portion and a tab portion formed along one edge, said tab portion being arranged between said deflecting means and the second end of the lower heat exchanger so that said collecting portion projects axially upstream from said heat exchanger;
    baffle means on said collecting portion formed along the other edge of said air guide means extending upwardly into the path of air passing through the lower portion of the upper heat exchanger so that when condensate in said lower portion of the upper heat exchanger is sufficient to be carried by said air flow through said heat exchanger, it impinges on said baffle means and said collecting portion and is directed to said drip pan thereby preventing said condensate from being carried out of said housing by said air flow.

2. An air handling structure including a housing having a heat exchanger arranged in the path of a flow of air, a drip pan means in said housing arranged below said heat exchanger for receiving condensate from said heat exchanger, said heat exchanger including a pair of generally horizontally extending slab heat exchangers arranged one above the other, each having a first upstream and a second downstream axial ends; said first ends being substantially parallel and spaced from each other to define an opening therebetween to allow movement of air therethrough, and converging axially toward said second ends so that substantially all of the air moving through the opening contacts the heat exchangers; air deflector means connecting said second ends of said heat exchangers and extending laterally relative to the air flow path substantially the full width of said heat exchangers; said air deflecting means being substantially diamond shaped to provide a smooth flow of air at its upstream side to maintain a parallel air flow through all of said heat exchanger and thereby preventing eddying of said air flow at the downstream side of said air deflector, wherein the improvement comprises:
    a condensate guide means extending substantially the full width of said air deflector means including a condensate collecting portion and a tab portion formed along one edge, said tab portion being arranged between said deflecting means and the second end of the lower heat exchanger so that said collecting portion projects axially upstream from said heat exchanger;
    baffle means on said collecting portion formed along the other edge of said air guide means extending upwardly into the path of air passing through the lower portion of the upper heat exchanger so that when condensate in said lower portion of the upper heat exchanger is sufficient to be carried by said air flow through said heat exchanger, it impinges on said baffle means and said collecting portion and is directed to said drip pan thereby preventing said condensate from being carried out of said housing by said air flow.

3. The invention as set forth in claim 2 wherein the air deflector is provided with outwardly projecting tabs at its lateral ends that are secured to said heat exchanger so that a passageway is provided for receiving said tab means.

4. The invention as set forth in claim 3 wherein a plurality of holding means are spaced laterally along said tab portion being dimensioned and positioned axially to engage said deflecting means for removably locating said guide means in said passageway relative to said converged end of said heat exchanger.

5. The invention as set forth in claim 4 wherein a condensate shield means extends downstream and generally upwardly from said drip pan partially into the path of air passing through said lower heat exchanger being arranged to receive and direct condensate into said drip pan when it is carried by said air flow past said drip pan.

6. The invention as set forth in claim 5 wherein the flow of air is at the rate of between 350 and 550 cubic feet per minute per ton of cooling capacity of said heat exchangers.

7. The invention as set forth in claim 6 wherein the space between laterally extending free end of said collecting portion and the lower edge of said upper heat exchanger is between 0.25 and 0.50 inches.

* * * * *